United States Patent
Colegrove et al.

(10) Patent No.: US 8,002,362 B2
(45) Date of Patent: Aug. 23, 2011

(54) OPTIMAL THERMAL PROPERTIES IN LIGHT WEIGHT AND HIGH PERFORMANCE BRAKING COMPOSITE CLINCHER OR TUBULAR TIRE BICYCLE WHEEL RIM

(75) Inventors: James Colegrove, Lake Mills, WI (US); David Guzik, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 1187 days.

(21) Appl. No.: 11/208,706

(22) Filed: Aug. 15, 2005

(65) Prior Publication Data

US 2007/0194619 A1    Aug. 23, 2007

Related U.S. Application Data

(63) Continuation-in-part of application No. PCT/US2004/004638, filed on Feb. 17, 2004, and a continuation-in-part of application No. PCT/US2004/004970, filed on Feb. 17, 2004.

(51) Int. Cl.
*B60B 25/00* (2006.01)
(52) U.S. Cl. ............... 301/95.103; 301/95.104
(58) Field of Classification Search ............... 301/55, 301/58, 95.101–95.108, 95.11, 99, 6.9, 64.701–64.702; 294/501, 510–512, 516, 523, 544–546, 553; 188/24.11, 24.1, 24.13; 264/501, 510–512, 264/516, 523, 544–546, 553
See application file for complete search history.

(56) References Cited

U.S. PATENT DOCUMENTS

| 492,667 | A | 2/1893 | Fitzgerald |
|---|---|---|---|
| 509,261 | A | 11/1893 | Stall |
| 578,292 | A | 3/1897 | Johnson |
| 1,236,921 | A | 8/1917 | Fraser |
| 3,433,327 | A | 3/1969 | Regis |
| 3,732,951 | A | 5/1973 | Hata et al. |
| 4,030,754 | A | 6/1977 | Merlette |
| 4,294,490 | A | 10/1981 | Woelfel |
| 4,314,964 | A | 2/1982 | Ferrary |
| 4,483,729 | A | 11/1984 | Fujisaki et al. |
| 4,529,253 | A | 7/1985 | Ho |
| 4,741,578 | A | 5/1988 | Viellard |
| 4,749,235 | A | 6/1988 | McDougall |
| 4,832,414 | A | 5/1989 | Jones |
| 4,919,490 | A | 4/1990 | Hopkins et al. |

(Continued)

FOREIGN PATENT DOCUMENTS

EP    0579525 A1    7/1993

(Continued)

OTHER PUBLICATIONS

International Search Report for PCT/US04/04970.

*Primary Examiner* — Jason Bellinger
(74) *Attorney, Agent, or Firm* — Ladas & Parry LLP; David C. Brezina (57) ABSTRACT

A fiber reinforced plastic bicycle wheel rim is formed of six segments per side and formed in a section having precisely formed, machinable brake surfaces and preferably combining inner high modulus fiber reinforced plastic lamination as a main structural body and an outer lamination of improved frictional coefficient materials at the braking surfaces. The main structural body with overlapped individual sheets of unidirectional fiber reinforced plastic, having crossing fibers, in segments, and continuous unidirectional fiber bundles in areas of concentrated load, enables strong, light wheels for sew up or clincher tires to be formed.

13 Claims, 3 Drawing Sheets

U.S. PATENT DOCUMENTS

| | | | |
|---|---|---|---|
| 4,930,843 | A | 6/1990 | Lewis |
| 4,938,540 | A | 7/1990 | Sacks |
| 4,995,675 | A | 2/1991 | Tsai |
| 5,012,900 | A | 5/1991 | Ishibashi |
| 5,056,630 | A | 10/1991 | Fujii et al. |
| 5,061,013 | A | 10/1991 | Hed et al. |
| 5,080,444 | A | 1/1992 | Hopkins et al. |
| 5,249,846 | A | 10/1993 | Martin et al. |
| 5,277,479 | A | 1/1994 | Koyama et al. |
| 5,282,673 | A | 2/1994 | Koyama et al. |
| 5,452,945 | A | 9/1995 | Schlanger |
| 5,540,485 | A | 7/1996 | Enders |
| 5,549,360 | A | 8/1996 | Lipeles |
| 5,564,793 | A | 10/1996 | Whiteford |
| 5,603,553 | A | 2/1997 | Klieber et al. |
| 5,624,519 | A | 4/1997 | Nelson et al. |
| 5,692,764 | A | 12/1997 | Klein et al. |
| 5,707,114 | A | 1/1998 | Schlanger |
| 5,734,142 | A | 3/1998 | Kazmierczak |
| 5,779,323 | A | 7/1998 | Burrows |
| 5,941,606 | A | 8/1999 | Chen |
| 5,944,932 | A | 8/1999 | Klein et al. |
| 5,975,645 | A | 11/1999 | Sargent |
| 5,985,072 | A | 11/1999 | Finck et al. |
| 6,086,161 | A | 7/2000 | Luttgeharm et al. |
| 6,216,758 | B1 | 4/2001 | Chen |
| 6,270,104 | B1 | 8/2001 | Nelson et al. |
| 6,283,557 | B1 | 9/2001 | Okajima et al. |
| 6,340,509 | B1 | 1/2002 | Nelson et al. |
| 6,347,839 | B1 | 2/2002 | Lew et al. |
| 6,398,313 | B1 | 6/2002 | Lew |
| D462,042 | S | 8/2002 | Bernardi |
| 6,520,595 | B1 | 2/2003 | Schlanger |
| 6,679,561 | B2 | 1/2004 | Addink et al. |
| 2002/0033635 | A1 | 3/2002 | Meggiolan |
| 2003/0107260 | A1 | 6/2003 | Ording et al. |
| 2004/0021366 | A1 | 2/2004 | Colegrove |

FOREIGN PATENT DOCUMENTS

| | | |
|---|---|---|
| FR | 2573012 | 5/1986 |
| FR | 2 774 032 | 1/1998 |
| GB | 2051700 | 1/1981 |
| WO | WO 96/25296 | 8/1996 |

Fig. 4

OPTIMAL THERMAL PROPERTIES IN LIGHT WEIGHT AND HIGH PERFORMANCE BRAKING COMPOSITE CLINCHER OR TUBULAR TIRE BICYCLE WHEEL RIM

This application is a Continuation In Part of application based on Applications Nos. PCT US2004/004638 and PCT US2004/004970, filed Feb. 17, 2004.

BACKGROUND OF THE INVENTION

1. Field of the Invention

The invention is an improved one-piece, hollow bicycle wheel rim having improved sectional shape and surface for high performance caliper braking and composite layup providing lighter weight and increased strength in an economical manner.

2. Description of Related Art

Basic principles of optimum compaction low void composite molding the bicycle industry are described in U.S. Pat. Nos. 5,624,519 and 6,270,104, sharing a common assignee with this application. The disclosures in U.S. Pat. Nos. 5,624,519 and 6,270,104 are incorporated by reference as if fully set forth herein. It will be noted that the fiber/resin areal ratios taught in those patents correspond to a fiber to resin ratio of about 65/35 by weight.

Metal wheel rims have long been made by bending a straight extrusion, bar or other shape to a circular form and then joining the ends to make a closed circle. It is also known to machine a brake surface, particularly after welding an aluminum rim, as in European Patent Office Publication No. 0579525A1. These patents and publications are incorporated by reference as fully set forth herein.

Owing to the different strength, and coefficient of friction properties of composite fiber reinforced plastics, particularly the high tensile strength and high stiffness of materials such as carbon fiber, the base material is formed to shape prior to curing However there has long been a concern about the performance of such structurally sound rims under high performance caliper braking conditions, such as in a long, fast descent on a mountain road.

Three typical methods of forming a wheel. or wheel rim from carbon fiber reinforced plastic are known in the prior art. The first of these is a cored composite in which the high strength skin surrounds a core such a foam core, U.S. Pat. No. 5,061,013. The second is a solid composite such as U.S. Pat. No. 6,347,839 B1 in which composite laminations have no designed end openings or different density materials between interior and exterior surfaces. The third prior art approach is a partially hollow but plugged construction such as U.S. Pat. No. 6,398,313 B1 where two hollow halves have interior inserts and exterior reinforcements at joining ends. The disclosures in these three patents are incorporated by reference as if fully set forth herein. U.S. Pat. No. 6,991,300, which issued from an application that had been copending with the present application, discloses use of optimum compaction, low void manufacturing for an aerodynamic section, two piece rim. The disclosure therein is incorporated by reference herein.

The segmented arrangement used in the invention improves on the prior art such as Lew U.S. Pat. Nos. 6,347,839 or 6,398,313 by using general principles of optimum compaction low void composite construction specially adapted to the unique shape and structural requirements of high braking performance and light weight wheel rims using a combination of laminates incorporating fibers at different angles relative to one another.

Notably, unlike prior art carbon fiber wheel or rim forming techniques, the instant rims are formed from a plurality of prepreg segments, tabbed to overlap to result in a solid wall, but hollow rim. Preferably six segments per side, for a total of twelve, are formed surrounding a bladder, with overlapping tabs on each side and at the center plane, such that under curing pressure and temperature there is a continuous chemical bond in the preferred epoxy matrix. Six segments per side better aligns the fibers with expected loads when the preferred 0-45-90 degree oriented fiber layups are used. The segments are staggered from side to side so that seams on one side do not line up transversely across from seams on the other side.

The molds contain plugs or projections to form spoke nipple access holes and enabling precise alignment of the spoke hole finishing tools. The valve stem hole can also be provided for in this manner.

After forming the uncured skin, the unit is placed in a mold, the mold closed, the bladder pressurized while the mold is heated. When fully cured, the rim is removed from an opened mold and the bladder removed. Finishing of the access holes and spoke holes is accomplished and, if desired, the brake walls may be further machined.

The preferred carbon fiber reinforced epoxy laminate structure has a tough, high performance braking surface, which may also be made machinable.

DETAILED DESCRIPTION OF THE PREFERRED EMBODIMENT

A wheel rim 10 is formed of fiber reinforced plastic resin. Preferably this is formed predominantly of a high modulus fiber, such as carbon fiber, in an epoxy matrix, with special structural locations containing other fibers commensurate with needs in areas having unique performance and/or manufacturing requirements, such as brake surfaces. Thus, strong, but more easily machinable fibers, such as glass can be used in certain areas, and tougher fibers, such as Kevlar, can be used in high impact areas.

The fibers in the individual segments are aligned in laminations such as taught in U.S. Pat. Nos. 5,624,519 and 6,270,104 sharing a common assignee with this application. By using a series of 0-45-90 degree alignments, the high strength and high modulus properties of carbon fiber can be used to advantage to produce a shape of complex curvature having substantially uniform strength in the needed directions in the finished structure, while the optimum compaction and low void methods, as improved for wheel rims as taught herein, produces the finished structure having a substantially uniform density.

It will be apparent that when 0-45-90 degree aligned fibers are formed in a circular rim die cut from a continuous flat layup, an individual fiber line, tangent at a first point on the rim, is skewed at 45 degrees from the tangent at a second point, spaced 45 degrees circumferentially. At the second point, fibers in an adjacent layer are tangent. Thus, for a 45 degree arc of the rim, fibers diverge from the tangent, to a third point half the 45 degree arc, at which point the fibers in the adjacent layer converge to the second point of tangency. Because carbon fiber is extremely strong at certain load orientations, it is desirable to keep the fiber orientation in line with the loads—mainly circumferentially and radially. By dividing the overall structure into six layups, spaced around 60 degree arcs, much closer alignment of fibers is maintained.

Optimum fiber to resin ratios substantially above the industry standards are also permitted by the product and process taught herein.

Figure 1:
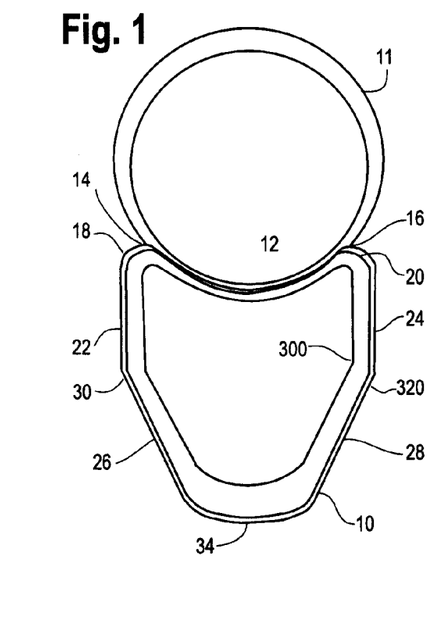
FIG. 1 is a sectional view showing the sectional shape of a tubular rim and a tire.
Figure 2:
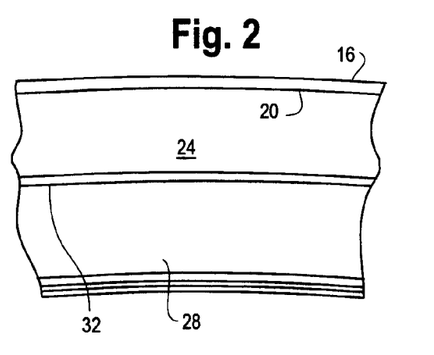
FIG. 2 is a fragmentary side elevational view of a portion of the rim.
Figure 3:
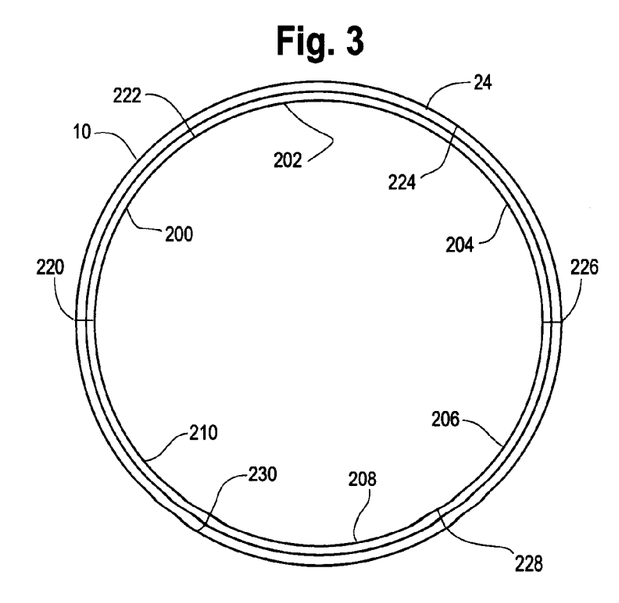
FIG. 3 is a side elevational view of the rim.

Rim 10 as shown in one embodiment is a high performance road racing rim adapted to receive a conventional glued-on "tubular" or "sew-up" tire 11 in which the tire and tube are formed together as a unit and this unit is adhesively affixed to the tire well 12 and further mechanically held in place by virtue of the inflation pressure in the tube, compressing the unit around the rim 10. As shown in FIG. 1, tire well 12 extends between left and right apexes 14, 16. As described with respect to FIGS. 7 and 10 tubular tires can also be accommodated, with some changes in the mold insert and molding process and adapting the lamination schedule.

Depending downwardly from apexes 14, 16 are bevels 18, 20. Bevels 18, 20 space brake surfaces 22, 24 radially inwardly (toward the axle of the wheel relative to apexes 14, 16 and well 12) and transversely outwardly (away from the center plane of the rim) from apexes 14, 16. Well 12 is smoothly curved with a dimension corresponding to that needed to receive a high performance "sew-up" tire 11 with a diameter of around one inch, typically 21 to 28 mm.

Sharp changes in curvature in tire well 12 are avoided to maximize utilization of standard tires and to maximize their adhesion and other performance, however bevels 18, 20 form a significant spacing between apexes 14, 16 and brake surfaces 22, 24. Because bevels 18, 20 shown in section in FIG. 1 are formed in a three dimensional, circular rim, they form, in actuality, a conical segment at an angle from the central axis (corresponding to the axis of the axle of the wheel) of about 20 degrees from the horizontal.

Extending downwardly from apexes 14, 16 are braking surfaces 22, 24 which join left and right inwardly angled interior walls 26, 28. Inwardly angled interior walls 26, 28 join walls 22, 24 at concavities 30, 32. Concavities 30, 32 provide lateral spacing of brake walls 22, 24 away from the center plane of the wheel. inwardly angled interior walls 26, 28 meet spoke bed 34.

The relative dimensions of the section disclosed approximate a structure that is 'square' in that distance from spoke bed 34 to tire well is almost equal to the distance across the brake walls 22, 24.

Braking surfaces 22, 24 are substantially flat and preferably 19 to 22 mm across for a high performance road tire of a nominal width of about the same nominal width. This width is considered a high performance, light weight, high speed tire having minimal weight and friction. As rim and tire systems use compatible ranges of sizes, wider rims could be designed for wider tires, such as 24 or 25 mm rims for tires of those nominal dimensions for wheel specially designed for rough road races, such as races historically run on cobblestones, or races in weather conditions requiring wider tires.

Keeping in mind that specific lamination schedules are generally in accordance with the teachings of the aforementioned U.S. Pat. Nos. 5,624,519 and 6,270,104, certain wheel rim advantages are shown in the schematic arrangements of laminations. The individual laminations of each segment are each comprised of component unidirectional fiber layers arranged at 0-45-90 degrees relative to one another.

A number of unique attributes are present in the wheel rim of this invention, compared to other carbon fiber reinforced plastic wheel rims.

The light weight, high performance 'climbing' rim is preferably made from a one piece mold, having no joints. As such, the preferred structure is different from several alternative rims, such as those using a pair of mating arc segments, or a pair of arc segments joined with special joint pieces. Nevertheless, on deep section rims, such as "aero" rims, however, geometric considerations may justify two piece rims, bonded together after curing. Unlike one piece wheels, such as disc wheels, using all fiber reinforced plastic rim, spokes and hub assemblies, the light weight, high performance 'climbing' rim or the aero rim, uses separate components of rim, spoke and hub assembly to obtain maximum lightness and performance.

The preforms used to make the one piece rim disclosed herein differ from other attempts to form wheels from fiber reinforced plastics in that other methods typically attempt to maximize the size and continuity of the preforms by using the largest preforms suitable to molding. In the rim disclosed herein, preferably six segmented preforms per side are used. The use of segmented preforms enables the alignment of fibers that more closely follow the lines of stress in the structure.

While the quasi-isotropic nature of the 0-45-90 degree fiber oriented preforms provides an excellent strength to weight relationship, in a round structure, like a bicycle wheel rim, it has been discovered that aligning six segments around the circumference of a rim provides better fiber alignment.

Figure 5:
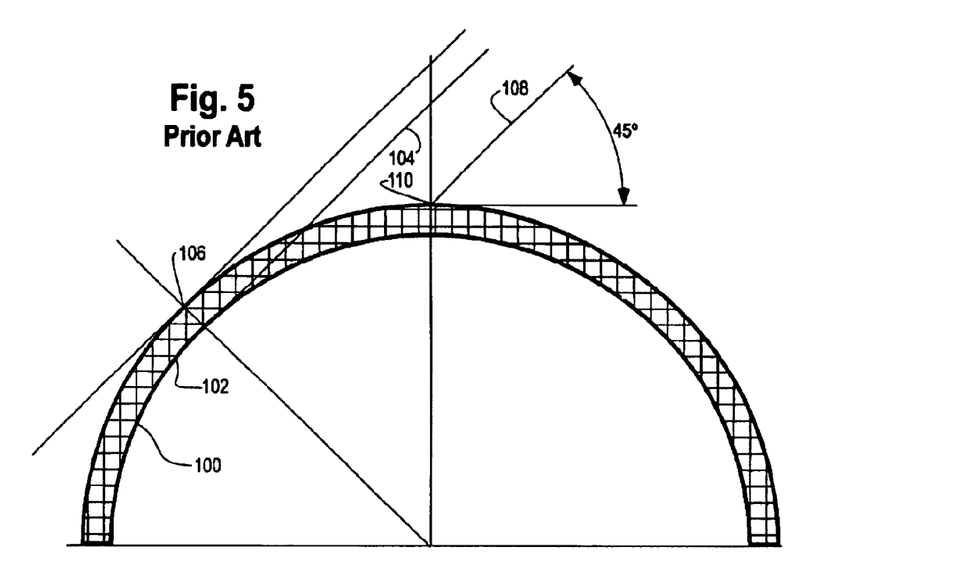
FIG. 5 is a schematic view showing prior art fiber alignment.

As shown in FIG. 5, in the prior art rim 100 comprised of a semicircular lamination 102, an individual fiber line 104, is tangent at a first point 106 on the rim. A parallel fiber line 108, is skewed at 45 degrees from the tangent at a second point, 110, spaced 45 degrees circumferentially from the first point 106. Thus, for a 45 degree arc of the rim, fiber lines 104, 108 angularly diverge from the tangent. Because carbon fiber is extremely strong at certain load orientations, it is desirable to keep the fiber orientation in line with the loads—mainly circumferentially and radially.

Figure 6:
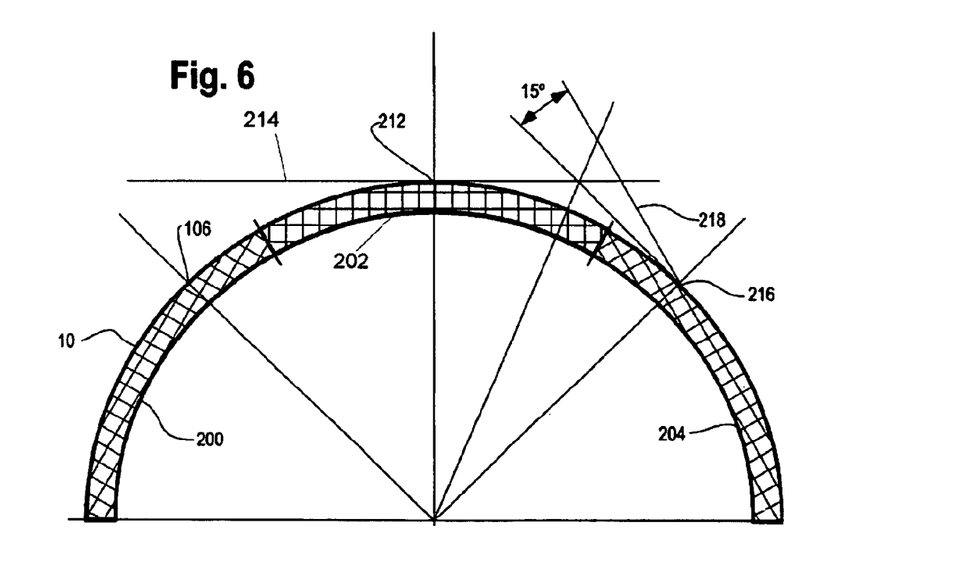
FIG. 6 is a schematic view showing fiber alignment in the invention.

As shown in FIG. 6, by dividing the overall structure 10 into six segments per side 200, 202, 204, 206, 208, 210, spaced around 60 degree arcs, much closer alignment of fibers is maintained. At the point of tangency 212 of segment 202 fiber line 214 is parallel to the tangent. At point of tangency 216 displaced 45 degrees from point 212, the fiber line 218 closest to parallel to the tangent is only is only 15 degrees from parallel to the tangent. Because segment 202 is where point 212 is located and segment 204 is where point 216 is located, the overall rim 10 is stronger, stiffer and lighter than prior art carbon rims formed from a single circular layup or semicircular layup. As will be described further, other overlaps of other laminations, and the inclusion of a unidirectional "0 degree" bundle or "rope" further strengthens the structure. The aforementioned relationships are for illustration, and from the benefits of this teaching, and that in the references incorporated herein, the person of ordinary skill will be able to practice the invention using the parameters taught herein.

An added benefit of the use of overlapping segments, compared to circular or semicircular layups is that much less waste of materials results and cutting patterns are more simple.

Figure 4:
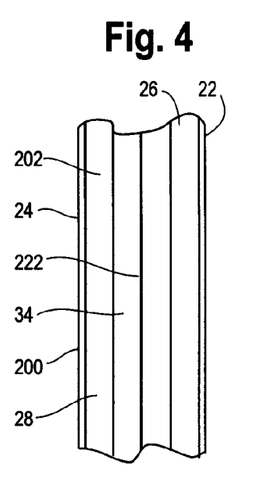
FIG. 4 is a fragmentary bottom plan view of a portion of the rim.

Each side of the rim is layed up of six segments, each abutting or with a slight over lap at seams 220, 222, 224, 226, 228, 230. The reverse side is layed up in a similar fashion. The segments from side to side are staggered, as shown in FIG. 4, so that a seam, such as 220, will be aligned with the center of the reverse side segment 200R, and the seams between reverse side segments will be aligned opposite the center of a segment, such as 200. When compacted and cured, a seamless rim will be formed.

The tirewell preform consists of 5-6 segments with circumferentially overlapping tabs to form a seamless overlapping continuous surface. The tirewell preforms also overlap to structurally tie the two braking sidewalls together forming one continuous structure. The "O degree" bundle or rope in the apexes and the spoke bed, and in the clincher hook beads on the clincher embodiment further contribute to strength. In this manner, strength, stiffness and mass are balanced rather than concentrated at certain points.

The overlapping ends of the tire well preforms provide junctions between adjacent fiber orientations, with more fibers at the junction. Of course the compression of the molding process coupled with effective curing of the plastic resin results in a solid structure, even with the junctions, seams and overlaps.

The rim of this invention relies primarily on an inner layer of high modulus fiber reinforcement in a thermoset plastic matrix. Excellent structural performance is obtained with carbon fiber in an epoxy matrix, although other combinations are not intended to be excluded.

In keeping with the high performance molding techniques used, and a high fiber areal weight, the structural and mechanical characteristics of carbon fiber bear significantly on the mechanical properties of the braking surface, should the braking surface be comprised of the same fiber reinforced plastic as the structural layer. The high modulus, extremely hard and stiff carbon has a low coefficient of friction when exposed to elastomeric caliper brake pads such as those used on bicycles. As the carbon comprises about 60 to 70 percent or more of the structure, (preferably 65/35 carbon to resin, by weight) brake surfaces have been an inherent problem for carbon fiber bicycle wheel rims.

In the invention herein, the entire exterior surface of the wheel is a separate lamination formed of a glass fiber scrim in an epoxy matrix. The glass provides some structural strength, but it is negligible when compared to the carbon fiber structural base laminations. The major structural effect is mainly to maintain the outer layer intact. The glass fiber scrim, however provides a superior braking surface. Because the outer layer and the inner base laminations are fibers in an epoxy resin matrix applied one over another prior to compression and curing, in the curing process, the epoxy forms a continuous matrix of chemically cross linked molecules. The outer, glass reinforced layer has the additional advantage of being easily machinable, as compared to a layer of carbon fiber reinforcing fibers. Carbon fiber machining causes substantial wear on tools.

In keeping with the adaptation of the instant rim to wheels used in demanding 'climbing' conditions—such as road races in mountain areas having thousands of feet of vertical changes—the completed wheel can be formed having complementary components with the traits of the rim. By comparison to 'aerodynamic' wheels, more spokes can be used. Mass in the rim can be reduced, with load being borne by spokes. Reduced mass helps the rider to devote power to greater speed on uphill climbs, while aerodynamic drag is not a substantial factor in speed riding downhill, and in fact distributing load over more spokes may assist in reducing wheel 'shimmy.' Thus, an all carbon wheel with integral hub spokes and rims, such as shown in the prior art, may have only three large spokes, at a weight penalty. Even a high performance aerodynamic carbon rim wheel with separate hub, spokes and carbon fiber rim may have sixteen spokes. The instant rim can be advantageously built into a wheel having twenty front spokes and twenty four rear spokes. An offset spoke bed as taught in U.S. Pat. No. 6,679,561 could be used.

In ordinary wheels, a standard sporting goods grade epoxy can be used for the prepreg materials from which the various layers are formed into prepregs. Because of the demands on the rims caused by braking, it has been discovered that a high temperature epoxy performs better. This insures that the structural integrity of the rim is maintained even on long downhill rides with extensive braking resulting in frictionally created heat.

Bicycle wheel rims formed of a hollow section have typically been machined, such as by drilling, to provide access holes for spoke attachment. Spoke attachment typically involves lacing wire (or other elongate structure) spokes from hub to rim, and fastening a spoke nipple to the end of the spoke, threaded thereto, for tightening and adjustment or 'truing.' Point loads on the rim at the location of the nipple are substantial, so the load can typically be spread by use of a washer or eyelet. The size of the washer is limited by the size of the access hole, as is the ease of manipulation of the nipple, or, when automatically assembled, the size of the tools used for automatic wheel assembly.

Drilling access holes in a hollow carbon fiber reinforced plastic rim is a difficult operation given the size of the holes and the strength, stiffness and hardness of the carbon. Some breakage of the fibers at the edge of the hole also results in abrupt changes in strength and stress paths in the material. Further, these edges provide manipulation difficulty for the wheel assembler. In the instant invention, the molding and preform arrangement used utilizes molded access apertures. This could be, and preferably will be, expanded to include the valve hole and spoke holes. By forming these in the mold, superior manufacturing efficiency, tool utilization, ease of manipulation and assembly and improved structural integrity over drilled holes is gained.

The spoke bed 34 formed herein uses the strength properties of carbon fiber reinforced plastic, and the design utility in molding to have a spoke bed thinner than in other carbon fiber rims. Although thinner, the spoke bed is formed with sufficient width to enable spoke drilling at a 2.75 degree drill angle. The spoke holes, aligned with the aforementioned access apertures can also be formed with 0.100" stagger. This will provide greater lateral stability in the wheel, with the designed number of spokes, such that a lower wheel weight, particularly at the rim, will permit good high speed, downhill performance.

Figures 7, 8:
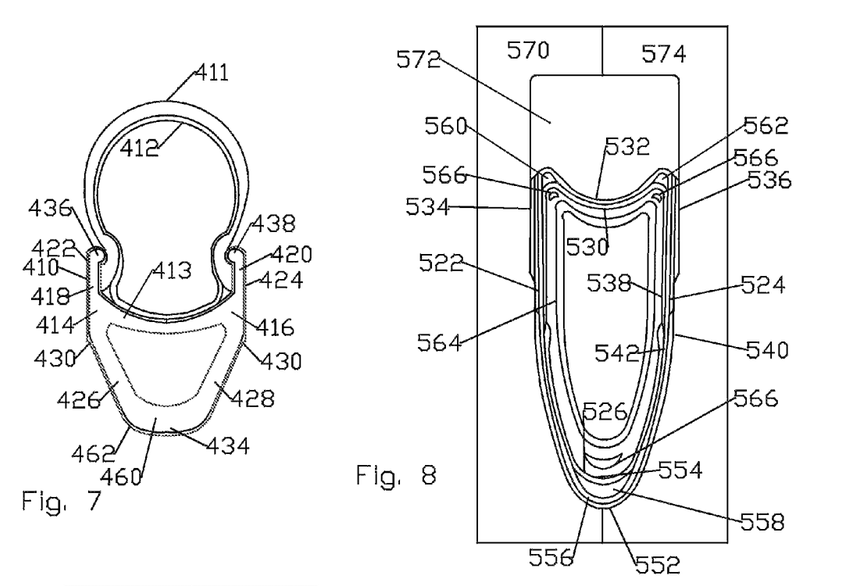
FIG. 7 is a sectional view showing the sectional shape of a clincher and a tire.
FIG. 8 is a sectional view showing the layup of laminations in a tubular aero rim in a mold.
Figure 9:
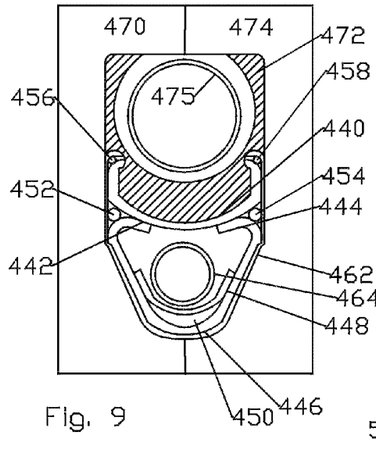
FIG. 9 is a sectional view showing the layup of laminations in a clincher rim in a mold.
Figure 10:
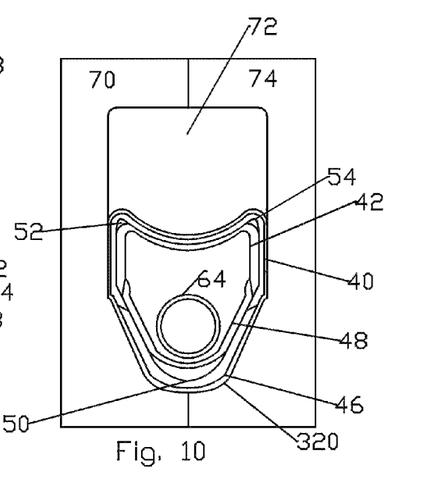
FIG. 10 is a sectional view showing the layup of laminations in a tubular rim in a mold.

FIG. 8-10 illustrate the arrangement of laminations in section. The six-segment-per-side arrangement contributes greatly to the circumferential strength of the wheel—reactive to loads primarily perpendicular to the axle, such as those imposed by rider weight, spoke tension and bumps. The sectional shapes also contribute to sideward loads such as those imposed during steering and leaning, and particularly on the rear wheel, by acceleration.

The climbing carbon section is shown in FIG. 10. The terms "upward" and "downward" will be understood to refer to the orientation of the portion of the rim shown in FIG. 10, it being understood that the actual rim rotates so the physical orientation can change. The wheel is called a climbing carbon rim because it uses somewhat lighter and somewhat higher pressure tubular or sew up tires, and is therefore advantageous in competitions such as Tour de France mountain stages.

Spoke bed 34 and walls 26, 28, are formed of overlapped laminations. The climbing carbon sew up tire well is formed with a main tirewell lap 40 and inner tirewell lap 42 that span the top portions of a large spoke bed lap 46 and an inner, smaller spoke bed lap 48, inside the brake surfaces 22, 24. There is sufficient overlap of the edges of the laps 40, 42, 46 and 48 that a strong unitary structure will be formed after curing the epoxy resin. Essentially, in the sew up rim, the tirewell and spoke bed are spaced farther than in the clincher rim, so double laps 40, 42 are used to form the tirewell and structure behind the brake surfaces 22, 24, while in the clincher rim the tirewell lap is relatively inverted so as to form the flanges from a single lap or lamination.

Additional strength in this segmented rim arrangement is provided by laying up the described laps or laminations around continuous, unidirectional 0 degree bundles or ropes. One rope 50 reinforces the spoke bed 34 being compressed between laps 46, 48. A left apex rope 52 and right apex rope 54 reinforce at the apexes and are compressed between laps 40, 42. Lap 40 is compressed with ropes 52, 54 and rope 50 compressed between laps 46, 48 so that a unitary composite structure is formed with fibers reinforcing in the required directions, with the continuous fibers of ropes 50, 52, 54 providing additional circumferential strength.

The foregoing layup, comprising the main structural body 300, is formed and arranged, over bladder 64, with fiberglass scrim 320 over the carbon fiber epoxy prepreg portions forming the main structural body or inner layer 300. The layup is placed in first mold half 70, with tire well insert 72 in place. Second mold half 74 is closed, bladder pressurized and heat substantially simultaneously applied to cure the resin into a monolithic plastic matrix surrounding the reinforcing fibers. As will be discussed below, insert 72 can be replaced with other shapes to form other types of rims.

The clincher section in FIG. 7 has wheel rim 410 which retains tire 411 and inner tube 412 within tire well 413 and is formed with apexes 414, 416 at the intersection of flanges 418, 420, with tire well 413. The terms "upward" and "downward" will be understood to refer to the orientation of the portion of the rim shown in FIG. 7 although the actual rim rotates and the orientation can change. External on flanges 414, 416 are brake surfaces 422, 424. The basic shape is formed in a manner analogous to the tubular tire version, such as shown in FIG. 1, with interior walls 426, 428 depending radially downwardly and transversely inwardly from concavities 430, 432 to spoke bed 434. Thus, brake surfaces 422, 424, extend transversely outwardly (away from the center plane of the rim) from apexes edges of flanges 414, 416, just as brake surfaces 22, 24, extend transversely outwardly (away from the center plane of the rim) from apexes 14, 16. A clincher rim has hook beads 436, 438 formed at the edges of flanges 414, 416. Forming the tire area 440 defined by hook beads 436, 438, flanges 414, 416 and tire well 413 with smooth surfaces greatly enhances tire and tube durability. Hook beads 436, 438 are formed as shown in the drawings, to be smooth hook beads in which the entire hook profile has no sharp edges, and are formed in the mold using carbon fiber reinforced plastic laminations.

In the carbon clincher section, such as shown in FIG. 9, spoke bed 434 and walls 426, 428, are formed of overlapped laminations. The clincher tire well is formed with a main tirewell lap 440 that spans the top portions 442, 444 of a large spoke bed lap 446 at each tire well apex. Inner, smaller spoke bed lap 448 spans the spoke bed 434 between the walls 426, 428, but is not needed to extend to apexes 414, 416. Because of the geometry of this section, and the use of six segments per side, spoke bed 434 and walls 426, 428 as well as portions of apexes 414, 416 can be formed from laps or laminations that comprise greater sectional portions of the rim. Additional strength to the segmented rim is provided by laying up the described laps or laminations around continuous, unidirectional 0 degree bundles or ropes. One rope 450 reinforces the spoke bed 434 being compressed between laps 446, 448. A left apex rope 452 and right apex rope 454 reinforce at the intersection of flanges 418, 420, tire well 413 and brake surfaces 422, 424. From a composite structure standpoint, this is where lap 440 is compressed with portions 442, 444 so that with ropes 452, 454 a unitary composite structure is formed with fibers reinforcing in the required directions, with the continuous fibers of ropes 452, 454 providing additional circumferential strength. Similarly hook beads 436, 438 have ropes 456, 458 compressed and cured adjacent the upper edges of lap 440. The foregoing structure comprises an underlying composite structure 460. Overlying structure 460 is an outer layer 462 preferably formed of a glass fiber scrim to provide improved brake coefficient and improved machinability. Additional strength is also contributed by layer 462, although the tensile strength of glass fibers is considerably less than that of carbon fibers.

The foregoing layup is formed and arranged over bladder 464. Bladder 464 is used to mold this one piece, monocoque rim in keeping with the teachings of U.S. Pat. Nos. 5,624,519 and 6,270,104. Depending on the sectional shape formed, anything from a flexible bladder such as an inner tube or a welded plastic sheet, to a specially formed conforming bladder may be suitable. Thus, as shown in FIG. 9, a tube bladder is appropriate.

The layup around the bladder 464, is placed in a first mold half 470. Mold half 470 also has a tire well mold insert 472 and outer bladder 475 to form the requisite shape. Second mold half 474 is closed, bladder 464 pressurized substantially simultaneously with bladder 475 and the resin cured under heat and pressure. Insert 472 as shown forms the flanges 422, 424 and hook beads 436, 438 to receive clincher tires. A flexible insert 472 can impart pressure on laps and layers to create a unitary composite as bladder 475 is pressurized. A material such as silicone has advantages of both being flexible, expanding to enhance pressure when heated and to not stick to cured epoxy. Access holes aligning with planned spoke locations can be formed in tire well 413 to enable removal of bladder 464. Bladder 475 and insert 472 can be readily removed by opening mold 472, 474 after heating and completion of curing. The cured rim 410 will thus comprise a unitary fiber reinforced composite with unidirectional fibers aligned closely with expected loads, typically not diverging by more than about 15 degrees. This arrangement also enables the smooth hook beads as shown in the drawings which can be formed with sufficient precision that they will not need to be machined in order to present a surface that does not overly wear or damage the tire or inner tube.

In an aerodynamic section, such as shown in FIG. 8, spoke bed 526 and walls 522, 524 are formed of overlapped laminations. The tire is formed of two layers, tire well inner layer 530 and tire well outer layer 532 at each tire well apex.

However the general arrangement, used in the body of the rim, is to form three laminations—inner lamination 538, outer lamination 540 and middle lamination 542. Specific areas of the rim have additional (apexes or spoke bed) or fewer (tire well) fiber layers, but the general arrangement is the three laminations 538, 540, 542. Laminations 538, 540 and 542 effectively form an all carbon fiber reinforced plastic sandwich with voids therebetween eliminated by the compaction process.

If each lamination uses, for example, eight unidirectional plies with their fibers oriented at 0-45-90 degrees relative to one another, 24 ply quasi-isotropic walls would be formed. Indeed, quasi-isotropic properties would result from as few as four plies, per lamination, with the described fiber orientation.

Bottom outer layer 552, bottom inner layer 554 and bottom middle layer 556 bridge the joint between the two portions of lamination 538. Braking surface laminations 534, 536 are laid outward of laminations 538.

Three "0 degree" bundles of fibers are included in high load areas of each of the embodiments. Between layers 554 and 556 is positioned spoke bed "0 bundle" or 'rope', 558. Left apex "0 bundle" or "rope" 560 and right apex "0 bundle" 562 are captured between tire well inner layer 530 and tire well outer layer 532 at each tire well apex. These bundles, 558, 560, 562 perform important structural functions.

In all embodiments, FIGS. 8, 9 and 10, the apexes, and spoke bed are highly loaded. The term "0 bundle" or "rope" is used to describe, in these locations, unidirectional fiber bundles with no crossing orientation. These bundles or ropes 50, 52, 54, 450, 452, 454, 456, 458, 558, 560, and 562 are formed in respective circles (or arcs where rim halves are formed and cured) at apexes and spoke bed such that the individual fibers present themselves parallel to the direction of travel of the bicycle at the point of tangency, or contact of the tire with the road surface, and are perpendicular to the spokes at any point of attachment of the spoke. No substantial side component is present in the orientation of these bundles or ropes, as compared to the 0-45-90 orientation of the laminations 40, 42, 46, 48, 440, 446, 448, 530, 532, 534, 536, 538, 540, 542, 554 and 556 which form the balance of the structure. Thus, strength and stiffness is specifically applied in desired directions relative to the road surface and the spokes.

Further, these bundles or ropes, 50, 52, 54, 450, 452, 454, 456, 458 558, 560, 562 are readily compressed in the complex shape of a hollow wheel rim 10 which will enable substantial elimination of voids between laminations and bundles by application of pressure to a bladder.

For ease of manufacture of the aero rim of FIG. 8, the geometry described herein permits the use of a bladder 564 formed of a simple tube, with the auxiliary use of pressure intensifiers 566 proximate apexes and/or spoke bed 526. Pressure intensifiers 566 are preferably formed of simple arc sectioned ribbons of silicone, or some other suitable elastomer that conforms to shape, tends to expand when heated and does not permit epoxy adhesion. In a deep section aero rim, use of pressure intensifiers 566 is particularly advantageous, while other rims 10 can be formed using simple bladders 64, 464.

As bladder 564 and pressure intensifiers 566 are used at high temperatures and pressures in close contact with epoxy impregnated laminations, the use of economical and easily replaceable bladders 564, and intensifiers 566 yields a functionally superior, yet economically feasible molding method.

The layup around the bladder 564, is placed in a first mold half 570. Mold half 570 also has a tire well mold insert 572 to form the requisite shape. Pressure intensifiers 566 are put in place. Second mold half 574 is closed, bladder 564 pressurized and the resin cured under heat and pressure.

As described below insert 572 or corresponding inserts for other tire well shapes enable the basic mold halves 570, 574 to be used for either tubular (sew-up) tire or clincher tire wheels.

Thus, one alternative is to form the rim in halves with mating plugs and a receptacles, cure each half and bond together post curing. Rims can also be formed in one piece, from segments, but using overlapping segments of laminations and 0 degree bundles or ropes to provide a high strength unitary structure.

A bladder 64, 564 or bladders 464, 475 are used to mold this one piece, monocoque rim in keeping with the teachings of U.S. Pat. Nos. 5,624,519 and 6,270,104. Depending on the sectional shape formed, anything from a flexible bladder such as an inner tube or a welded plastic sheet, to a specially formed conforming bladder may be suitable.

Rim 10 is formed of an main structural body 300 formed as discussed herein, and an outer lamination 320. Lamination 320 overlies the entire rim, including tire well 12, apexes 14, 16 and extend under braking surfaces 22, 24 to walls 26, 28 and spoke bed 34. This will extend to a second bladder used in conjunction with the trapped rubber thermally expandable flexible insert which is used to form the tire well and hook bead shape in the clincher style rim. All bladders and inserts are removable.

Braking surface laminations use glass fibers advantageously because those fibers have properties much different from high strength, high modulus carbon in the inner lamination 300. Braking surfaces 22, 24 perform best when used in conjunction with the highly refined, but commercially available bicycle caliper brakes known to one of ordinary skill, when surfaces 22, 24 are either formed in a precise mold or machined to a high level of smoothness and trueness. The carbon itself, however, provides a less desirable, harder surface and generally does not perform optimally in demanding conditions such as long, fast mountain road downhill rides.

Brake surfaces 22, 24 are also subject to wear and damage when in use, particularly as a result of contamination by foreign objects such as sand, stones, road tar and the like.

The glass scrim has a more optimum coefficient of friction with typical elastomeric caliper brake shoes, thus the combination of materials provides a performance advantage. Glass reinforced plastic has improved thermal, frictional, and machinability properties A range of high temperature thermoset plastic resins can be effectively utilized in the manufacture of carbon fiber rims. It has been discovered that due to a combination of the geometry of the section, number of plies used (weight), and the conditions of use, particularly heat caused by braking, tire friction and the thermodynamic properties of the section, epoxies with a basic cure temperature of 250 F, service temperature in the 170 F range or below and/or with a Tg of 265 F or less, can be functional, but not necessarily optimal in terms of weight to strength. Examples of usable epoxies and their properties are shown in the accompanying table:

| System | Tg (F.) | Service (F.) | Cure temp |
|---|---|---|---|
| 3501-6 | 400 | 270 | 350 |
| 8552 | 360 | 250 | 350 |
| 6264D | 265 | 170 | 250 |

| System | Tg (F.) | Service (F.) | Cure temp |
|---|---|---|---|
| 3501-5A | 400 | 270 | tougher than 3501-6 |

A comparison of FIG. 1 and FIG. 7 illustrates a carbon fiber reinforced plastic rim in service in either a "tubular" (FIG. 1) or "clincher" (FIG. 7) tire wheel. There are three general usage conditions, described herein as "normal", "high performance" and "maximum performance. The "normal" bicyclist, at moderate speeds and in moderate terrain, can be effectively served by a rim in either the tubular or clincher configuration and using a typical sporting goods grade, 250 cure, 170 or lower service temperature epoxy, with a Tg of 265, such as that used in the F6264D prepreg carbon fiber/epoxy product, sold by Hexcel Composites with an Administrative Office and Customer Service Center 5794 West Las Positas Bvd., P.O. Box 8181, Pleasanton, Calif. 94588-8781, Tel (925) 847-9500 Fax (925) 734-9676. This epoxy cures at 250° F. (121° C.) and has a service temperature at or lower than the cure temperature. One of ordinary skill will be aware that epoxy is a thermoset plastic that, once cured, remains solid at elevated temperatures.

For more high performance usage, rims are made with higher strength and lower areal weight carbon fiber in order to keep the desired performance with lower weight. It has been discovered that the high heat generated from braking is not effectively dissipated through the structure to the ambient air or other physical structures, particularly in a thin walled clincher tired wheel. In this regime, a higher cure temperature, higher Tg, and higher service temperature epoxy is more advantageous, such as the Hexcel Composites 8552 or 3501-6 resin. These resins are considered 350° F. cure temperature epoxies, with the 8552 resin has a service temperature of 250° F. (121° C.) and a Tg of 360 and the 3501-6 resin a service temperature of 350° F. (177° C.) and Tg of 400.

It will be understood by one of ordinary skill that cure temperatures are nominal, and full cure is dependent on both temperature and the time of the cure. Thus, in the bladder molding processes described herein, it will be advantageous to use a fairly high cure temperature which will allow a lower time for maintenance of both temperature and molding pressure. Thus, for example, a nominal 250° F. (121° C.) cure epoxy will have a cure temperature range from 225-300° F. (107-149° C.).

The maximum performance clincher rim can be most advantageously made using an epoxy with both a nominal cure temperature and a service temperature of 350° F. (177° C.) and Tg of greater than 350—as shown by the 8552 and 3501-6 resins with Tg of 360 and 400, respectively. Indeed, both rims can be most advantageously formed of this epoxy when performance rather than ease and economy of production are paramount.

In use in circumstances such as a high speed mountain descent, brakes will be used almost constantly. The brake pads (not shown) will bear on surfaces surfaces 422, 424. However these surfaces 422, 424 include portions of flanges 418, 420. By comparison, surfaces 22, 24 are supported at their termini by tire well 12 and spoke bed 34 with an open area therebetween. In the clincher rim, brake surfaces 422, 424 back on tire well 412 and, of course, the tube and tire will be contained between flanges 418, 420. Tires build up heat from road friction, during braking especially during high speed descents and by conduction when a road surface is hot. Heat will not be as significantly dissipated from the flanges, by comparison to a tubular tire rim. Therefore, for a light weight high performance rim a higher service temperature epoxy will maintain its chemically bonded properties and the appropriate solidity of the matrix, particularly in maximum performance environments. An epoxy with a service temperature of 350° F. (177° C.) and Tg of greater than 350, such as the 360 and 400 Tg resins described. serves best. This service temperature corresponds to a Tg of 350 or higher.

However, other considerations require an appropriate balancing of service temperature, cure temperature and cure properties. A normal use epoxy has the advantage of being easier to form and thus can be formed at lower temperatures, and for a smaller length of time to properly form and cure the part or structure. The high performance epoxy requires greater care in layup, and maintenance of a higher nominal cure temperature for a longer time.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

We claim:

1. A one-piece, hollow bicycle wheel rim formed of fiber reinforced plastic having first structural reinforcing fibers in a thermoset plastic matrix;

said rim having a spoke bed, angled side walls, braking surface walls and a tire well, with said tire well and braking surface walls joining at first and second apexes;

said braking surface walls being formed of second structural reinforcing fibers in a thermoset plastic matrix such that the braking surfaces of said braking surface walls provide for a higher coefficient of friction when subject to application caliper brake pads than is the coefficient of friction of walls reinforced solely with said first reinforcing fibers;

said first reinforcing fibers being aligned in a composite layup such that in the cured rim said first reinforcing fibers are contained within said resin matrix, said first reinforcing fibers are aligned to have a nominal line of substantially straight fibers in six layups, is spaced around the rim at substantially 60 degree arcs, so that the nominal line of fibers does not substantially deviate from parallel to a tangent to a circle defined by the outer edges of the rim;

said rim is formed from a plurality of prepreg segments, with tire well pieces of said preforms tabbed to overlap to result , in the cured rim, in a solid walled, but hollow rim;

said rim being formed from six prepreg segments per side, for a total of twelve, are formed surrounding a bladder, abutting or with slight overlap on each side and at the center plane, such that under curing pressure and temperature there is a continuous chemical bond in the preferred epoxy matrix so that in the cured rim the segments have said first fibers formed in arrays contained within said matrix, said arrays in said cured rim remaining intact and being aligned with expected loads when in the preferred 0 -45 -90 degree oriented fiber layups are used;

said segments are staggered from side to side so that in the cured rim, the locations of overlap of the arrays, which correspond to the layup of seams in the uncured layups on one side do not line up transversely across from the locations of overlap of the arrays, which correspond to the layup of seams in the uncured layups on the other side of the continuous unidirectional fiber bundles in said spoke bed and apexes crossing from segment to segment to circumferentially reinforce areas of concentrated load.

2. The invention of claim 1 further comprising:
said epoxy matrix being formed of cured epoxy having a Tg of at least as high as 360° F.

3. The invention of claim 1 further comprising:
said epoxy matrix being formed of cured epoxy having a Tg of at least as high as 400° F.

4. A one-piece, hollow bicycle wheel rim formed of fiber reinforced plastic having first structural reinforcing fibers in a thermoset plastic matrix;
said rim being formed and arranged to have a continuous, hollow sectional shape defined by a spoke bed, angled walls, braking surface walls and a tire bed;
said braking surface walls being formed of second structural reinforcing fibers in a thermoset plastic matrix such that the braking surfaces of said braking surface walls provide for a higher coefficient of friction when subject to application caliper brake pads than is the coefficient of friction of walls reinforced solely with said first reinforcing fibers;
said first reinforcing fibers being aligned in a cured composite rim in which a nominal line of substantially straight fibers in six layups, is spaced around the rim at substantially 60 degree arcs, so that the nominal line of fibers does not substantially deviate from parallel to a tangent to a circle defined by the outer edges of the rim;
third reinforcing continuous unidirectional fiber bundles located in said spoke bed and apexes crossing from segment to segment to circumferentially reinforce areas of concentrated load;
said tire well being formed of laminations such that in the cured rim fibers are contained within a resin matrix, said fibers being aligned in a "U" shaped opening upward for a clincher rim or downward for a tubular tire rim;
the thermoset plastic matrix being formed of cured resin having a Tg of greater than 350° F.

5. The invention of claim 4 further comprising: said matrix being formed of cured resin having a Tg of at least as high as 360° F.

6. The invention of claim 4 further comprising: said matrix being formed of cured resin having a Tg of at least as high as 400° F.

7. A fiber reinforced composite circular wheel rim for supporting a tire comprising:
a hollow sectional shape defined by a spoke bed with angled walls extending transversely outwardly therefrom;
brake surfaces extending outwardly from said walls and said brake surfaces ending in apexes;
said apexes having a tire well extending therebetween;
said rim formed and arranged in a one piece hollow fiber reinforced composite structure from a plurality of laminated segments joined and overlapped to form said structure;
said segments being formed of straight, unidirectional fibers;
each of said segments having a reference fiber line parallel to said fibers;
said rim having a circular perimeter;
said segments all having said reference fiber line diverging from any tangent to said perimeter by less than about 15 degrees;
said apexes being reinforced by continuous unidirectional fiber bundles;
said braking surface walls being formed of second structural reinforcing fibers in a thermoset plastic matrix such that the braking surfaces of said braking surface walls provide for a higher coefficient of friction when subject to application caliper brake pads than is the coefficient of friction of walls reinforced solely with said first reinforcing fibers.

8. The rim of claim 7 further comprising:
said tire well being formed of laminations such that in the cured rim fibers are contained within a resin matrix, said fibers being aligned in a "U" shaped opening upward for a clincher rim or downward for a tubular tire rim.

9. The rim of claim 7 further comprising:
said tire well being formed of laminations such that in the cured rim fibers are contained within a resin matrix, said fibers being aligned with hook bead flanges extending upward from said tire well the flanges and well defining a "U" shaped opening upward for a clincher rim;
said rim has a smooth hook bead in which the entire hook profile is formed with no sharp edges in a mold using fiber reinforced plastic;
said hook bead flanges being reinforced by continuous unidirectional fiber bundles.

10. The rim of claim 7 further comprising;
said laminations being compacted one against the other and cured to provide a structure having multiple overlapping fibers in a substantially monolithic thermoplastic matrix.

11. The rim of claim 7 further comprising:
said first reinforcing fibers being aligned in a composite layup in which a nominal line of substantially straight fibers in six layups, is spaced around the rim at substantially 60 degree arcs, so that the nominal line of fibers does not substantially deviate from parallel to a tangent to a circle defined by the outer edges of the rim.

12. The rim of claim 11 further comprising:
said rim being formed from six prepreg segments per side, for a total of twelve, said segments having been formed surrounding a bladder, abutting or with slight overlap on each side and at the center plane, such that under curing pressure and temperature there is a continuous chemical bond in the preferred epoxy matrix.

13. The rim of claim 12 further comprising:
said segments are staggered from side to side so that seams on one side do not line up transversely across from seams on the other side continuous unidirectional fiber bundles in said spoke bed and apexes crossing from segment to segment to circumferentially reinforce areas of concentrated load.

* * * * *